United States Patent [19]
Ohta et al.

[11] Patent Number: 6,089,356
[45] Date of Patent: Jul. 18, 2000

[54] BICYCLE BRAKE DEVICE

[75] Inventors: Katsuyuki Ohta; Osamu Kariyama, both of Osaka, Japan

[73] Assignee: Shimano Inc., Osaka, Japan

[21] Appl. No.: 09/372,599

[22] Filed: Aug. 12, 1999

Related U.S. Application Data

[62] Division of application No. 09/033,300, Mar. 2, 1998.

[51] Int. Cl.$^7$ ........................................... B62L 3/00
[52] U.S. Cl. ............................ 188/24.21; 188/24.12; 188/24.22
[58] Field of Search ................. 188/24.11, 24.12, 188/24.21, 24.22, 24.14, 24.15, 24.16, 24.19, 26

[56] References Cited

U.S. PATENT DOCUMENTS

| | | | |
|---|---|---|---|
| 3,921,764 | 11/1975 | Mathauser | 188/24.14 |
| 4,036,333 | 7/1977 | Mathauser | 188/24.14 |
| 5,636,716 | 6/1997 | Sugimoto et al. | 188/24.22 |
| 5,655,630 | 8/1997 | Sugimoto | 188/24.22 |
| 5,788,019 | 8/1998 | Lee et al. | 188/24.11 |
| 5,887,683 | 3/1999 | Yamashita | 188/24.19 |
| 5,894,913 | 4/1999 | Sugimoto | 188/24.21 |
| 5,913,387 | 6/1999 | Yamashita et al. | 188/24.21 |
| 5,960,913 | 10/1999 | Kuo | 188/24.19 |

FOREIGN PATENT DOCUMENTS

| | | |
|---|---|---|
| 62-1873 | 1/1987 | Japan . |
| 2129985 | 10/1990 | Japan . |
| 450429 | 7/1936 | United Kingdom . |

*Primary Examiner*—Robert J. Oberleitner
*Assistant Examiner*—Thomas J. Williams
*Attorney, Agent, or Firm*—Shinjyu Global IP Counselors, LLP

[57] ABSTRACT

A bicycle brake device has a pair of brake mechanisms for applying a braking action to a rim of a bicycle wheel. Each brake mechanism includes a mounting member which is fixedly coupled to the frame of the bicycle. Each brake mechanism further includes a brake arm, a linkage assembly, a brake shoe and a biasing member or return spring. In the preferred embodiments of the present invention, the linkage assembly is a four-bar linkage assembly in which a biasing member applies a stabilizing force to the links to reduce vibrational movement therein. In one embodiment, the biasing member is a torsion spring fixed about the pivot pin between the brake shoe attachment link and the brake arm. In a second embodiment, the biasing member is a torsion spring positioned between the inner link and the brake shoe attachment link. In a third embodiment, the return spring acts as both the spring for biasing the brake arm from the braking position to a release position as well as a biasing member for applying a stabilizing force on the linkage assembly to reduce vibrational movement of the linkage assembly.

10 Claims, 12 Drawing Sheets

BICYCLE BRAKE DEVICE

This Appln. is a Div. of Ser. No. 09/033,300 Mar. 2, 1998.

BACKGROUND OF THE INVENTION

1. Field of the Invention

The present invention generally relates to a brake device for bicycles and the like. More specifically, the present invention relates to a cantilever type bicycle brake device having a linkage mechanism for controlling the movement of the brake shoes against the rim of a bicycle wheel.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles which has been extensively redesigned over the past years is the bicycle brake device. Bicycle brake devices are constantly being redesigned to be lighter and provide additional braking power.

There are several types of bicycle brake devices which are currently available on the market. Examples of some types of common bicycle brake devices include rim brakes and caliper brakes. With respect to caliper brakes, there are mainly three types of caliper brakes: a side pull type, a center pull type and cantilever type. In a side pull type of caliper brake device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn move the brake shoes attached to the other ends of the brake arms together against the rim of the bicycle wheel. A return springs are provided for biasing the brake arms away from the bicycle wheel rim when the rider releases the brake lever. Side pull types of caliper brake devices are commonly used in road bikes.

A center pull type of caliper brake device operates similar to the side pull type, except that the brake arms are attached to a brake arm bridge such that each brake arm is pivotally coupled at a separate pivot point on the brake arm bridge. The brake arm bridge is attached directly to the frame of the bicycle. A straddle cable interconnects the two lever portions of the brake arms such that a main brake wire, which is coupled to the straddle wire, pulls the lever portions of the brake arms together.

A cantilever type of brake device is generally mounted on bicycle designs for off road use such as mountain bikes (MTB) and all terrain bikes (ATB). In particular, a cantilever type brake device is designed to provide a powerful braking force. A cantilever type of brake device is equipped with a pair of brake arms which are rotatably supported in a cantilever fashion on the front or rear fork of the bicycle frame, with the brake shoes attached to intermediate portions of the brake arms.

Typically, the lower ends of the brake arms are rotatably supported on the bicycle frame and the upper ends are linked to a brake cable or wire. The brake shoes are arranged opposite one another on either side of the bicycle wheel rim which is located between the arms. With this cantilever type of brake device, the bicycle arms rotate in the closing direction when the brake cable is pulled by the brake lever, which in turn results in the brake shoes being pressed against the rim to apply a braking force.

Cantilever types of brake devices have several advantages over side pull types of caliper brake devices. For example, with such a cantilever brake device, there is no need to vary the shape of the device with the size of the bicycle as may be the case with a side pull type caliper type brake device. Moreover, cantilever type of brake devices apply a more equal braking force than a side pull type caliper brake.

Accordingly, the present invention is especially directed to improving the performance of cantilever type brakes.

Unfortunately, cantilever type brake mechanisms suffer from their own problems. For example, if the brake shoes pivot downwardly from the horizontal plane as a result of the pivoting of the brake arms so that the brake shoes contact the side surfaces of the rim without conforming to the inclination of the side surfaces, then the pressing or braking force of the brake shoes is reduced. In other words, the brake shoes must be moved horizontally such that the slope of the brake shoes matches the slope of the rim to maintain full braking force. Consequently, it is often necessary to adjust the relative attachment positions of the rim side surfaces and the brake mechanisms with a high degree of precision. This adjustment is often difficult.

Accordingly, linkage assemblies have been utilized between the braking arms and the brake shoes to control the movement of the brake shoes from a release position to a braking position. In other words, these linkage mechanisms ensure that the brake shoes move substantially in a horizontal direction to match the slope of the bicycle rim. A brake device with a four-bar linkage assembly is disclosed in Japanese Publication No. 62-1873 that attempts to solve this problem. This four-bar link type of brake device comprises brake arms which are slidably supported on fixing pins that extend from seats, and the upper ends of which are positioned to the outside of the fixing pins, output links that are rotatably supported in the middle of the brake arms and extend to the outside, follower links that are rotatably linked to the output links and extend downwardly, and stationary links that are rotatably linked to the follower link and extend to the inside so that they are non-rotatably linked to the fixing pins.

The brake shoes are attached to the middle of the output links. With this brake device, when the brake arms are rotated upwardly by the brake cable, the follower links rotate to the inside, and the output links move horizontally or upwardly. As a result, the brake shoes hit the rim side surfaces.

With the above-mentioned structure, the frictional force of the bolt threaded into the tip of the fixing pin is utilized to link the stationary link to the fixing pin so that the stationary link does not rotate relative to the fixing pin. Consequently, when a powerful braking force is applied to the brake shoes, the stationary links are sometimes rotated against this friction by reaction forces so that the brake shoes escape from the sides of the rim, and a sufficient braking force is not obtained. Also, a sufficient braking force sometimes cannot be obtained when the links are caused to rotate by a loose bolt or by chatter. Furthermore, since the output to which the brake shoes are attached are linked in cantilever fashion to the brake arms, when a reaction force acts on the brake shoes during braking, the reaction force can cause the link portions to chatter and twist. When such chattering or twisting occurs, it allows the force that would otherwise be obtained with a four-bar linkage assembly to escape, so a powerful braking force is not obtained. Moreover, these four-bar linkage assemblies often chatter since when in the release position, since they are held in a cantilever fashion from the brake arms. Other four-bar linkage assemblies are disclosed in U.S. Pat. No. 5,636,716 to Sugimoto et al. and U.S. Pat. No. 5,655,630 to Sugimoto, both of which are assigned to Shimano Inc.

In view of the above, there exists a need for a brake device which reduces the vibrational movement of the linkage assembly. This invention addresses these needs in the art as well as other needs in the art which will become apparent to those skilled in the art from this disclosure.

SUMMARY OF THE INVENTION

One object of the present invention is to provide a brake device which reduces the vibrational movement of the linkage assembly coupled between the brake arms and the brake shoes.

The foregoing objects can basically be attained by providing a bicycle brake device, comprising: a first brake mechanism adapted to be movably coupled to a bicycle frame and a second brake mechanism adapted to be movably coupled to the bicycle frame; each of the brake mechanisms, including a brake arm having a first end adapted to be pivot about a first axis and a second end adapted to be coupled to a brake cable, a linkage assembly having a brake shoe attachment link adapted to fixedly attach a brake shoe thereto, the linkage assembly being movably coupled to the brake arm between a release position and a braking position, and a biasing member engaging the linkage assembly to apply a stabilizing force thereto.

The foregoing objects can basically be attained by providing a bicycle brake device, comprising: a first brake mechanism adapted to be movably coupled to a bicycle frame and a second brake mechanism adapted to be movably coupled to the bicycle frame; each of the brake mechanisms, including a brake arm having a first end adapted to pivot about a first pivot axis and a second end adapted to be coupled to a brake cable, a first link member having an outer end pivotally coupled to the brake arm about a second pivot axis and an inner end with a brake shoe attachment portion fixedly coupled thereto, a second link member having an upper end pivotally coupled to the inner end of the first link member about a third pivot axis and a lower end spaced from the upper end, a third link member having an inner end pivotally coupled to the lower end of the second link about a fourth pivot axis and an outer end pivotally coupled to the first end of the brake arm about the first pivot axis to form a fourth link between the first and second pivot axes, and a biasing member engaging two of the links to apply a stabilizing force therebetween.

The foregoing objects can basically be attained by providing a bicycle brake device, comprising: a pair of brake arms with each of the brake arms having first end adapted to be movably coupled to relative a bicycle frame and a second end adapted to be coupled to a brake cable; a linkage assembly movably coupled to the brake arms for controlling movement of brake shoes adapted to be coupled thereto during movement of the brake arms between a release position and a braking position; and a biasing member engaged with the linkage assembly for applying a stabilizing force on the linkage assembly to reduce vibrational movement thereof.

Other objects, advantages and salient features of the present invention will become apparent to those skilled in the art from the following detailed description, which, taken in conjunction with the annexed drawings, discloses three preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
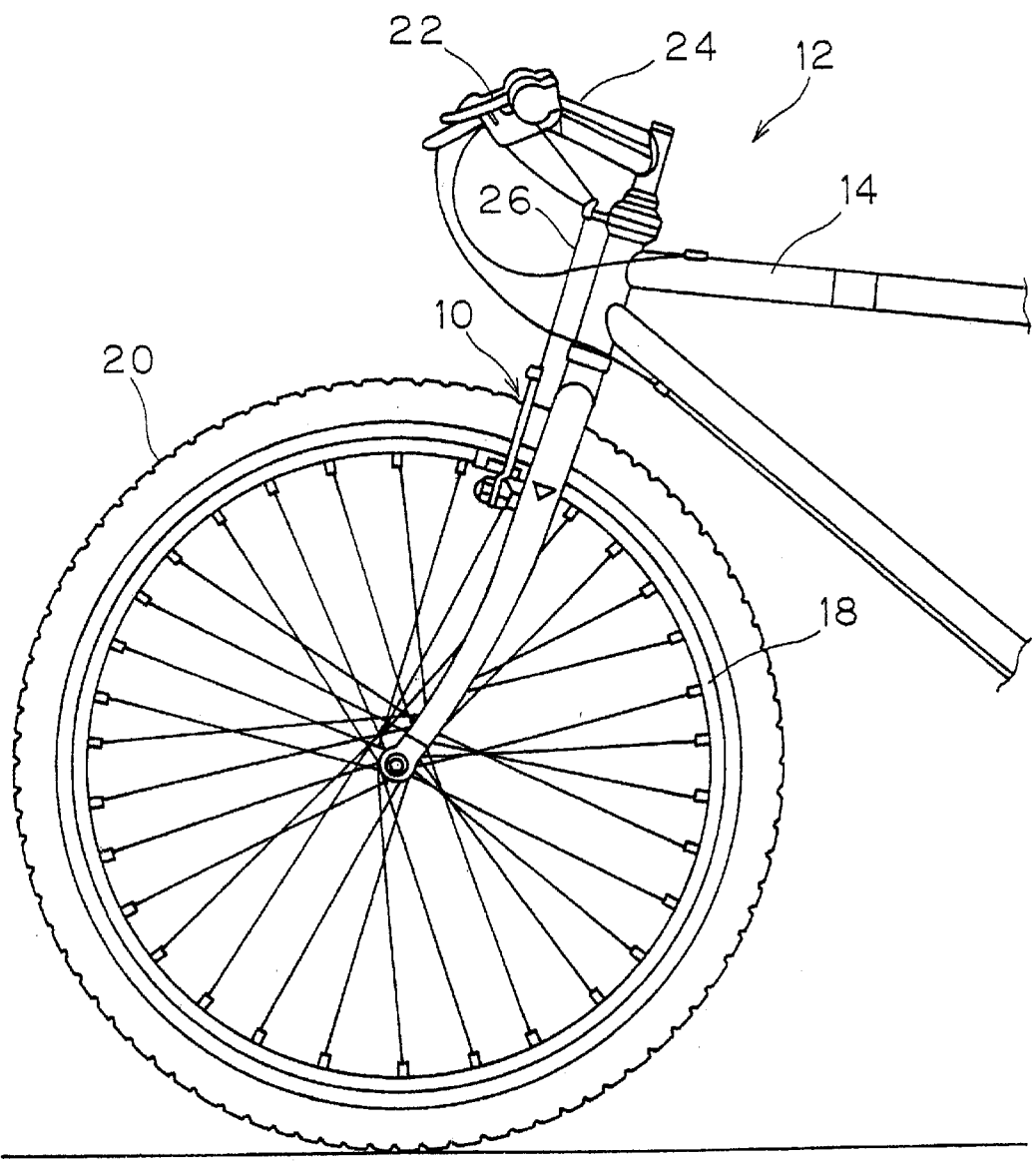
FIG. 1 is a partial, side elevational view of a conventional bicycle using a bicycle brake device in accordance with a first embodiment of the present invention.

Referring initially to FIG. 1, a bicycle brake device 10 is illustrated in accordance with the present invention. Bicycle brake device 10 is illustrated as being fixedly coupled to frame 14 of a bicycle 12. While bicycle brake device 10 is illustrated as being coupled to front fork 16 of bicycle frame 14, it will be apparent to those skilled in the art from this disclosure that bicycle brake device 10 can be coupled to the rear fork (not shown) of bicycle frame 14 in a conventional manner. Bicycle brake device 10 applies a braking force against rim 18 of bicycle wheel 20. Brake device 10 has an increased braking force over prior art brake devices by reducing chatter therein.

Bicycle brake device 10 is operated in a substantially conventional manner by the rider via a conventional brake operating device or lever 22 which is mounted on the handle bar 24 of bicycle 12 in a conventional manner. Bicycles and their various components are well-known in the art, and thus, bicycle 12 and its various components such as a brake operating device 22 will not be discussed or illustrated in detail herein.

Figure 2:
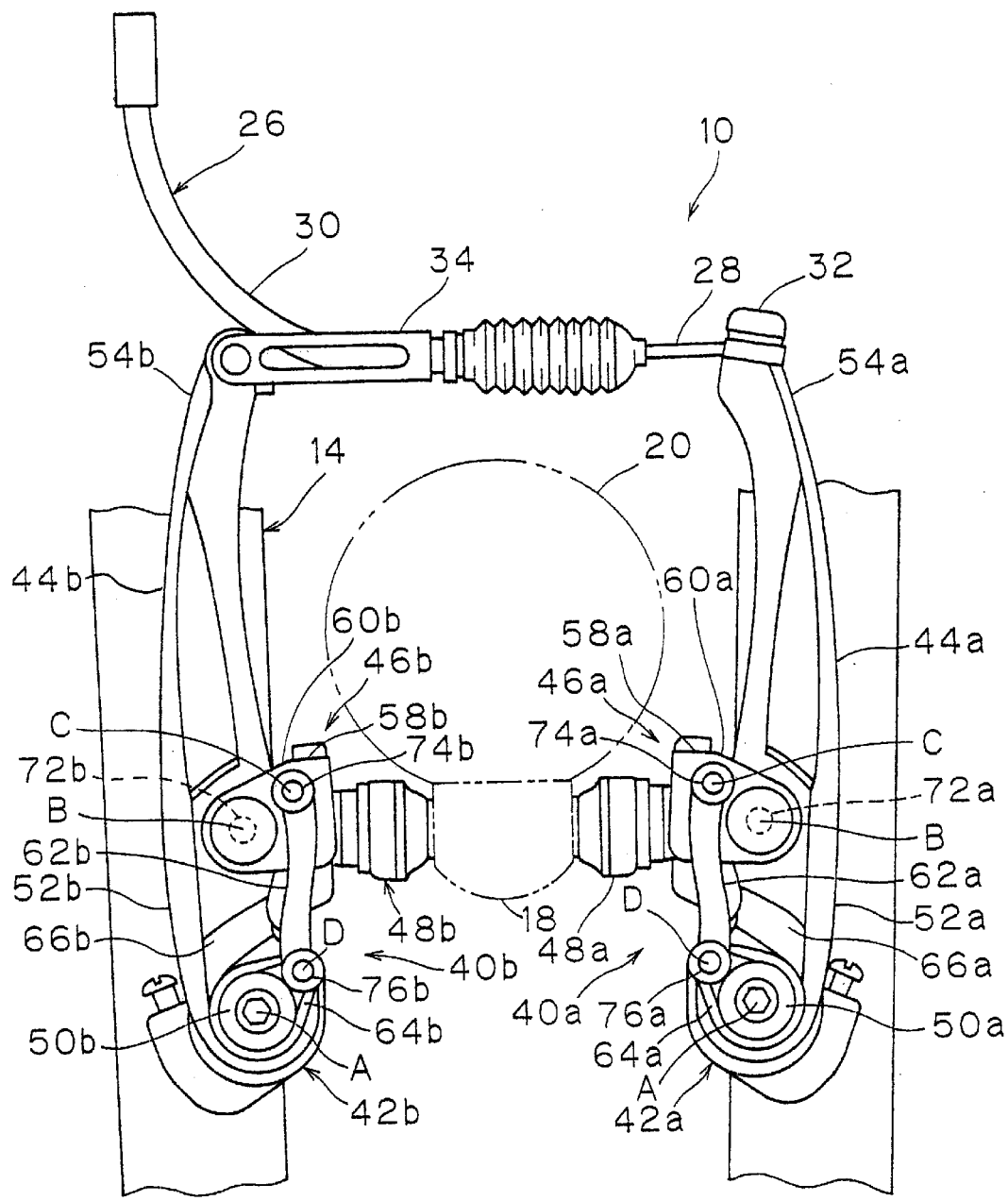
FIG. 2 is a front elevational view of the bicycle brake device in accordance with a first embodiment of the present invention with the brake device coupled to the front fork of the bicycle.
Figure 4:
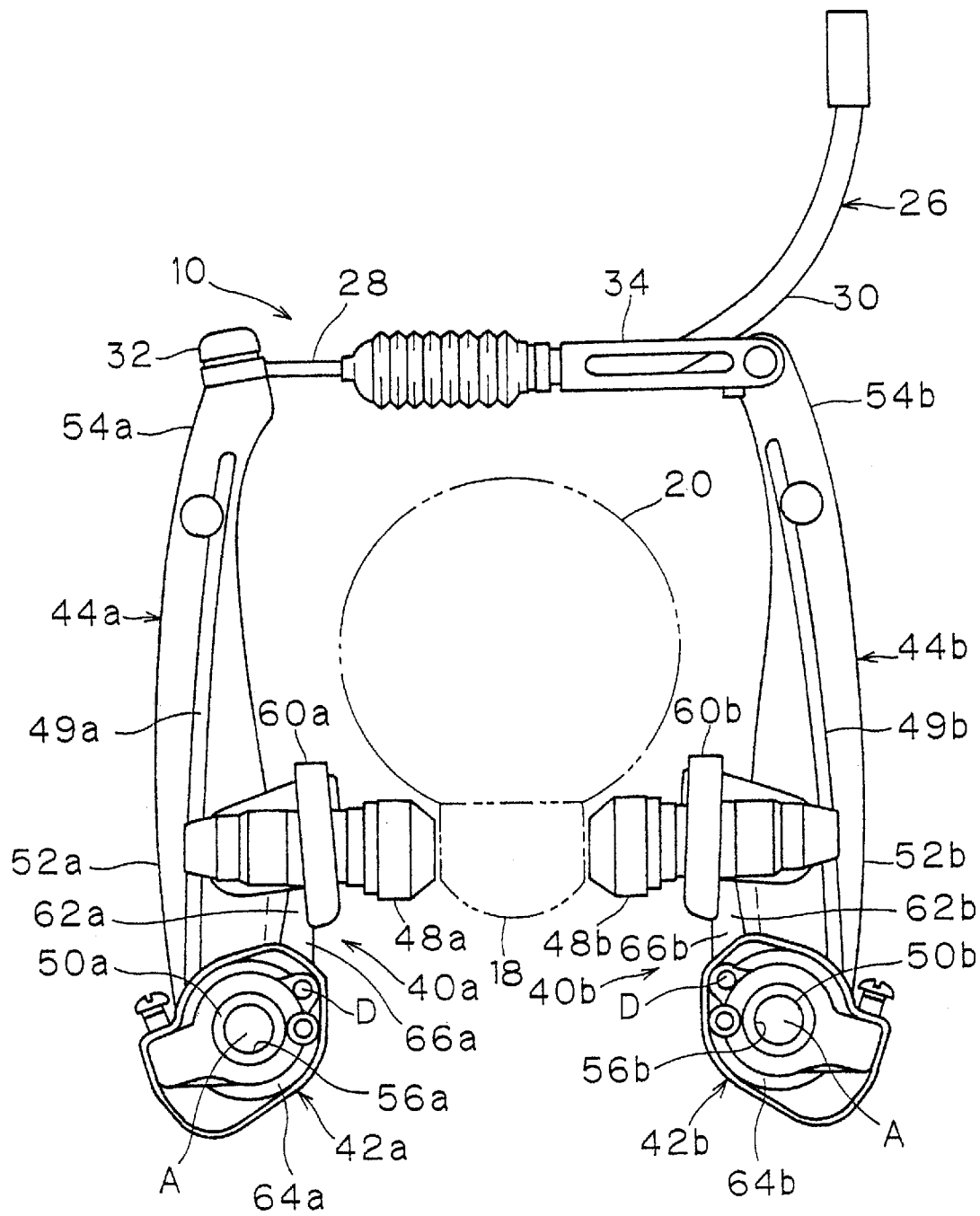
FIG. 4 is a rear elevational view of the bicycle brake device illustrated in FIGS. 2 and 3 in accordance with the first embodiment of the present invention.

As best seen in FIG. 1, taken in conjunction with FIGS. 2 and 4, brake device 10 is operatively coupled to brake operating device 22 via a brake cable 26 having an inner brake wire 28 and an outer casing 30. Basically, the rider will operate the brake operating device 22 which in turn will cause the brake device 10 to move inwardly to apply a braking force against rim 18 of the bicycle wheel 20. Upon releasing the brake operating device 22, the bicycle brake device 10 will release rim 18 to allow bicycle wheel 20 to rotate relative to the bicycle frame 14.

As best seen in FIGS. 2 and 4, brake device 10 basically includes a pair of brake mechanisms 40a and 40b which are substantially mirror images of each other, except for their connections to brake cable 26. Brake arm 44a is coupled to brake cable 26 via a lock bolt 32 which clamps brake wire 28 thereto. The outer casing 30 of brake cable 26 is coupled to brake arm 44b by a connecting arm 34 which is pivotally coupled at one end to brake arm 44b and has the outer casing of brake cable 26 coupled to it inner end.

Basically, right brake mechanism 40a includes a mounting assembly 42a for attachment to frame 14 of bicycle 12, a brake arm 44a pivotally coupled to mounting assembly 42a, a linkage assembly 46a coupled to brake arm 44a, a brake shoe assembly 48a movably coupled to brake arm 44a via linkage assembly 46a and a return spring 49a for moving brake arm 44a, linkage assembly 46a and brake shoe assembly 48a from a braking position to a release position. Right brake mechanism 40a pivots about pivot axis A. In particular, mounting assembly 42a is supported on pivot pin of frame 14 of bicycle 12 for supporting right brake mechanism 40a between a release position and a braking position. During pivotal movement of right braking mechanism 40a, brake shoe assembly 48a moves its brake pad against the rim 18 of the bicycle wheel 20 to prevent rotation of bicycle wheel 20 relative to bicycle frame 14. Movement of bicycle shoe assembly 48a is controlled by linkage assembly 46a to ensure a powerful braking force is obtained.

Likewise, left brake mechanism 40b basically includes a mounting assembly 42b for attachment to frame 14 of bicycle 12, a brake arm 44b pivotally coupled to mounting assembly 42b, a linkage assembly 46b coupled to brake arm 44b, a brake shoe assembly 48b movably coupled to brake arm 44b via linkage assembly 46b and a return spring 49b for moving brake arm 44b, linkage assembly 46b and brake shoe assembly 48b from a braking position to a release position. In view of the substantial similarities between right and left brake mechanisms 40a and 40b, only the right brake mechanism 40a will be described and illustrated in detail herein. Moreover, as used herein, the terms "upper", "lower", "inner", and "outer" are to be interpreted as viewed in FIGS. 1–4.

Figure 3:
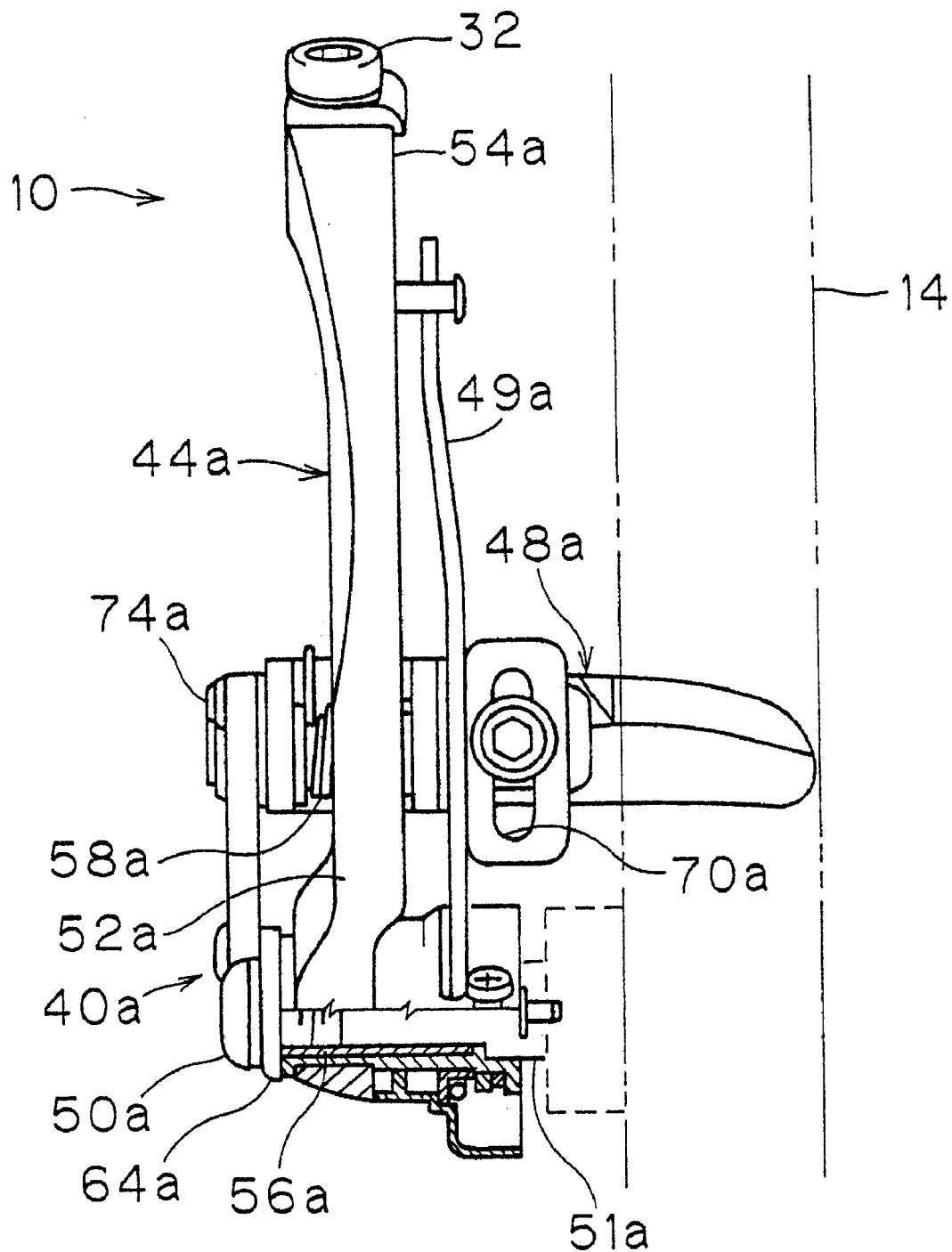
FIG. 3 is a right side elevational view of the bicycle brake device illustrated in FIG. 2 with the brake device coupled to the front fork of the bicycle.

Mounting assemblies 42a and 42b fixedly couple right and left brake mechanisms 40a and 40b to frame 14 via mounting pins or screws 50a and 50b in a conventional manner. In particular, as seen in FIGS. 2 and 3, screws 50a and 50b extend through tubular pivot pins 56a and 56b and are then threaded into mounting posts 51a and 51b of frame 14, respectively. Mounting assemblies 42a and 42b are relatively conventional mounting assemblies. Basically, mounting assemblies 42a and 42b are preferably designed in a manner similar to those disclosed in U.S. Pat. No. 5,636,716 to Sugimoto et al. and U.S. Pat. No. 5,655,630 to Sugimoto, both of which are assigned to Shimano Inc. The entire disclosures of these two patents are hereby incorporated herein by reference to explain mounting assemblies 42a and 42b, as well as to understand the basic operation of a brake mechanism which utilizes a four-bar linkage assembly. Therefore, mounting assemblies 42a and 42b will not be discussed or illustrated in detail herein.

Brake arms 44a and 44b are preferably constructed of a suitable rigid material. For example, brake arms 44a and 44b can be casted or machined from any suitable material such as aluminum, titanium, dense plastic, ceramic, acrylic, etc. Preferably, brake arms 44a and 44b are constructed of a lightweight material to minimize the weight of brake device 10. As best seen in FIGS. 2–3, brake arm 44a has a first or lower end 52a and an upper or second end 54a. Lower end 52a is pivotally coupled to mounting assembly 42a, while upper end 54a is coupled to wire 28 of brake cable 26. During braking, the upper or second end 54a of brake arm 44a is moved against the bias of return spring 49a by brake cable 26 to apply a braking force against rim 18 of the bicycle wheel 20. Accordingly, brake arm 44a rotates about a first pivot axis A which is formed by a tubular pivot pin 56a which mounts brake arm 44a to the frame 14 of the bicycle 12 as well as mounts a portion of linkage assembly 46a thereto, as mentioned above.

Left brake arm 40b is similarly constructed, except for its upper end. Accordingly, the parts of brake arm 44b will be labeled with reference numerals similar to that of right brake arm 44a, except that the reference numerals will be designated with a letter "b" instead of letter "a".

Brake arms 44a and 44b have their upper portions or ends 54a and 54b coupled to brake cable 26 in a conventional manner. Specifically, the upper end 54a of brake arm 44a is coupled to brake cable 26 via lock bolt 32 which is received in a threaded hole on the upper end 54a of the brake arm 44a, The lock bolt 32 clamps brake wire 28 against the upper end 54a of brake arm 44a. The outer casing 30 of brake cable 26 is coupled to the upper end 54b of brake arm 44b, In particular, as seen in FIGS. 2 and 4, connecting arm 34 is pivotally coupled to the upper end 54b of brake arm 44b at one end and has the outer casing 30 of brake cable 26 coupled to its inner end. Application of brake operating device 22 causes the upper ends 54a and 54b to move inwardly towards each other so that the brake pads of brake shoe assemblies 48a and 48b engages the side surfaces of rim 18.

Specifically, the upper ends 54a and 54b of brake arms 44a and 44b have brake shoe assemblies 48a and 48b coupled thereto via linkage assemblies 46a and 46b. Therefore, this pivotal movement of the brake arms 44a and 44b causes the brake pads of brake shoe assemblies 48a and 48b to engage the rim of the bicycle wheel. Of course, brake arms 44a and 44b are normally biased by return springs 49a and 49b from their braking positions to their release positions.

Linkage assemblies 46a and 46b are substantially identical and mirror images of each other and utilize biasing members 58a and 58b to provide a stabilizing force thereto for reducing vibrational movement or chatter. In view of the similarities between linkage assemblies 46a and 46b, they will be given identical reference numerals except for the right linkage assembly will be designated with a letter "a" and the left linkage assembly will be designated with a letter "b". Linkage assembly 46a forms a four-bar linkage assembly with brake arm 44a. In particular, linkage assembly 46a includes an upper or brake shoe attachment link 60a, an inner link 62a, a lower or fixed link 64a and a portion 66a of brake arm 44a forms a four-bar linkage. Portion 66a of brake arm 44a is the section of brake arm 44a that extends between the attachment points of upper and lower links 60a and 64a to form the fourth link of the four-bar linkage.

Linkage assembly 46a is designed to move brake shoe assembly 48a relatively uniformly each time in a generally horizontal direction. More specifically, brake shoe attachment link 60a has an outer end pivotally coupled to an intermediate portion of brake arm 44a and an inner end pivotally coupled to an upper end of inner link 62a. The lower end of inner link 62a is in turn pivotally connected to an inner end of the fixed or lower link 64a. The outer end of fixed or lower link 64a is pivotally coupled to brake arm 44a by the pivot pin 56a for pivoting about the pivot axis A.

Brake shoe assembly 48a is fixedly coupled to the inner end of brake shoe attachment link 60a. As brake arm 44a moves from a release position to a brake position, linkage position 46a controls the movement of brake shoe assembly 48a as it moves to engage the rim 18 of the bicycle wheel 20.

Brake shoe attachment link 60a and 60b are substantially identical, except that they are mirror images of each other. Each brake shoe attachment link 60a or 60b is basically a U-shaped member which straddles an intermediate portion of the brake arm 44a or 44b. The outer end of brake shoe attachment link 60a is pivotally coupled to brake arm 44a via a pivot pin 72a for pivotal movement about pivot axis B. The inner end of brake shoe attachment link 60a has an opening 70a therein for attaching brake shoe assembly 48a thereto in a conventional manner.

Inner link 62a is pivotally coupled to brake shoe attachment link 60a via pivot pin 74a and pivotally coupled to fixed lower link 64a at its lower end via a pivot pin 76a. In other words, brake shoe attachment link 60a and inner link 62a pivot relative to each other about pivot axis C formed by pivot pin 74a, while fixed lower link 64a and inner link 62a rotate relative to each other about pivot axis D formed by pivot pin 76a.

Fixed link 64a is fixedly coupled to mounting assembly 42a such that during movement of brake arm 44a from a release position to a braking position or vice versa, fixed link 64a does not move. Fixed lower link 64a has its inner end coupled to the lower end of inner link 62a via pivot pin 76a. The outer end of fixed link 64a is coupled to pivot pin 56a such that brake arm 44a can rotate relative to fixed link 64a about pivot axis A.

In this embodiment, the biasing members 58a and 58b are positioned between brake shoe attachment links 60a, 60b and brake arms 44a, 44b so as to apply a stabilizing force to linkage assemblies 46a and 46b. In particular, the biasing members 58a and 58b apply a force to linkage assemblies 46a and 46b to take up any play within the pivot points thereof Accordingly, biasing members 58a and 58b reduce vibrational movement and chatter of linkage assemblies 46a and 46b. Biasing members 58a and 58b also bias linkage assemblies 46a and 46b from their braking positions to their release positions. In other words, biasing members 58a and 58b operate together to normally move brake shoe assemblies 48a and 48b away from rim 18 of bicycle wheel 20. It will be apparent to those skilled in the art that return springs 49a and 49b can be eliminated by installing biasing members 58a and 58b which have a sufficient return force to hold brake arms 44a and 44b in their release positions. Of course, the biasing members 58a and 58b illustrated in the drawings would have to be stronger and thicker than the springs to effectively work as return springs.

Figure 5:
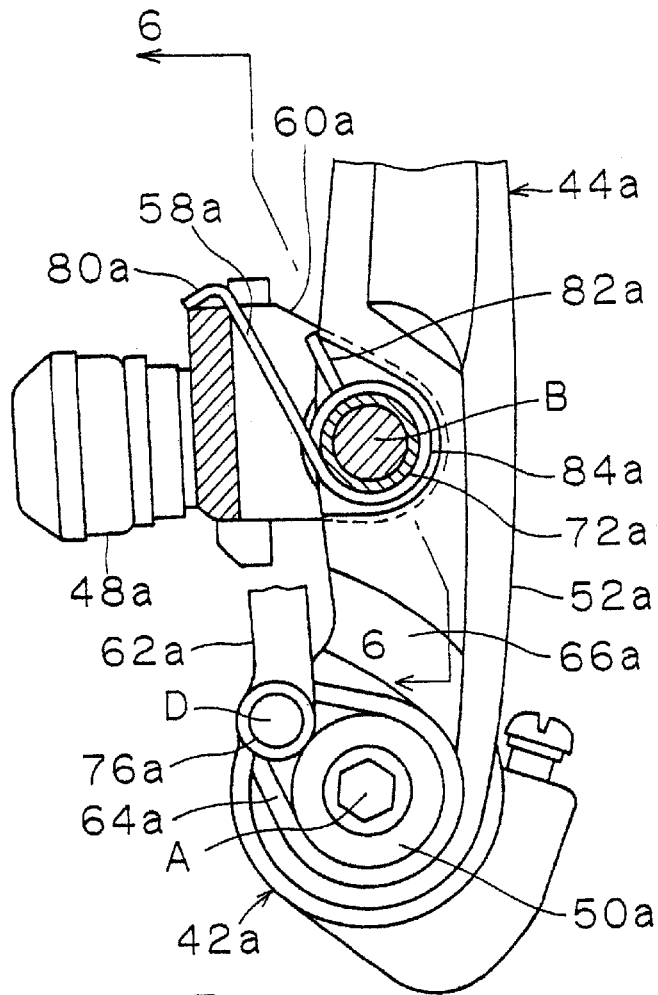
FIG. 5 is a partial, enlarged front elevational view of one of the brake mechanisms of the bicycle brake device illustrated in FIGS. 1–4 with portions broken away for purposes of illustrating selected parts.
Figure 6:
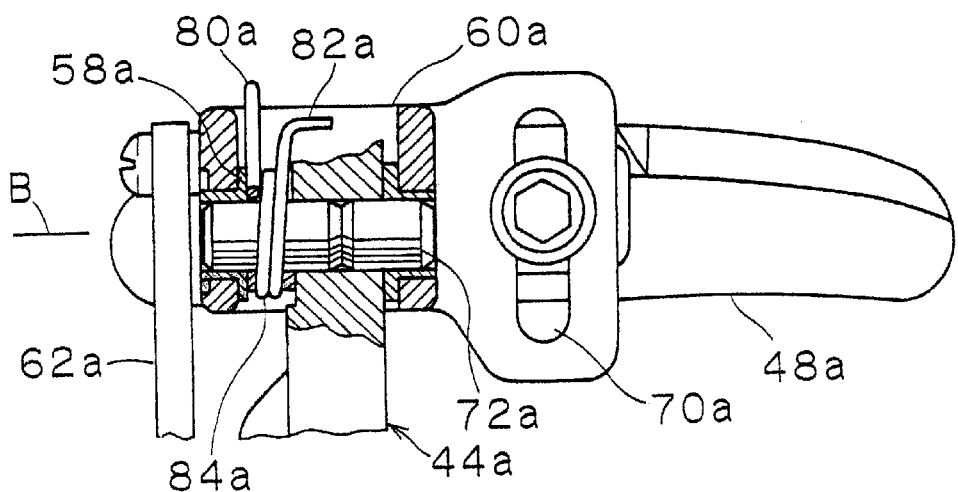
FIG. 6 is a partial, enlarged cross-sectional view of one of the brake mechanisms illustrated in FIGS. 2–5 as viewed along section line 6—6 of FIG. 5.

As seen in FIGS. 5 and 6, biasing member 58a is preferably a torsion spring which is constructed of a suitable resilient material such as spring steel. Biasing member 58a has a first end 80a for engaging brake shoe attachment link 60a and a second end 82a for engaging brake arm 44a, Torsion spring or biasing member 58a also has a coiled portion 84a which is positioned about the pivot pin 72a which interconnects brake shoe attachment link 60a to brake arm 44a. Of course, biasing member 58b is similar in construction to biasing member 58a, and thus, biasing member 58b will not be discussed or illustrated herein.

Preferably, the distance between the axis of pin 56a and the axis of pin 72a is equal to the distance between the axis of pivot pin 74a and the axis of pivot pin 76a. In other words, the distance between axis A and B is substantially equal to the distance between axis C and D. Also, the distance between the axis of pivot pin 72a and the axis of pivot pin 74a is substantially equal to the distance between the axis of pivot pin 56a and the axis of pivot pin 76a. In other words, the distance between axis B and C is substantially equal to the distance between axis A and D. Specifically, the four pins 56a, 72a, 74a and 76a are arranged such that they form the apexes of a parallelogram with a four-bar linkage being formed therebetween.

In operation, when the rider operates the brake lever of the brake operating device 22, the inner wire 28 of the brake cable 26 is pulled within the outer casing 30 of the brake cable 26 so that the upper ends 54a and 54b of the brake arms 44a and 44b are pulled inwardly. This results in brake arms 44a and 44b rotating about axes A, and the friction pads on brake shoe assemblies 48a and 48b being pulled inwardly to press against the side surfaces of rim 18 of the bicycle wheel 20 to cause a braking action to be performed. In other words, brake arm 44a rotates in a counterclockwise direction about pivot pin 56a against the course of return spring 49a, and brake arm 44b rotates in a clockwise direction about pivot pin 56b against the force of return spring 49b. Once the rider releases the brake lever of the brake operating device 22, the inner brake wire 28 of the brake cable 26 is relaxed so that the return spring 49a and 49b causes the brake arms 44a and 44b to pivot to their open or release positions. As a result, the tip ends of the friction pads on the brake shoe assemblies 48a and 48b are withdrawn from the side surfaces of the bicycle rim 18 so that the brake action is released.

Second Embodiment

Referring now to FIGS. 7–11, a brake device 110 is illustrated in accordance with a second embodiment of the present invention. This second embodiment differs from the first embodiment in that the biasing members 158a and 158b for stabilizing the linkage assemblies 146a and 146b are positioned between the brake shoe attachment link 160a or 160b and the inner link 162a or 162b instead of between the brake arm 144a and 144b and the brake shoe attachment link 160a or 160b as in the first embodiment. Also, this second embodiment differs from the first embodiment in that the lower or fixed links 164a and 164b each have an attachment portion which receives mounting screw 150a or 150b which is coupled to the frame 114 of the bicycle in a manner substantially similar to that of the brake device disclosed and illustrated in U.S. patent application Ser. No. 08/895,560, assigned to Shimano Inc. The entire disclosure of Ser. No. 08/895,560 is hereby incorporated herein by reference. In view of the similarities between the two embodiments, only the main differences between the first and second embodiments will be discussed and illustrated herein. Moreover, since the second embodiment utilizes many of the same parts of the first embodiment, these parts will be given a similar reference numeral.

Figure 7:
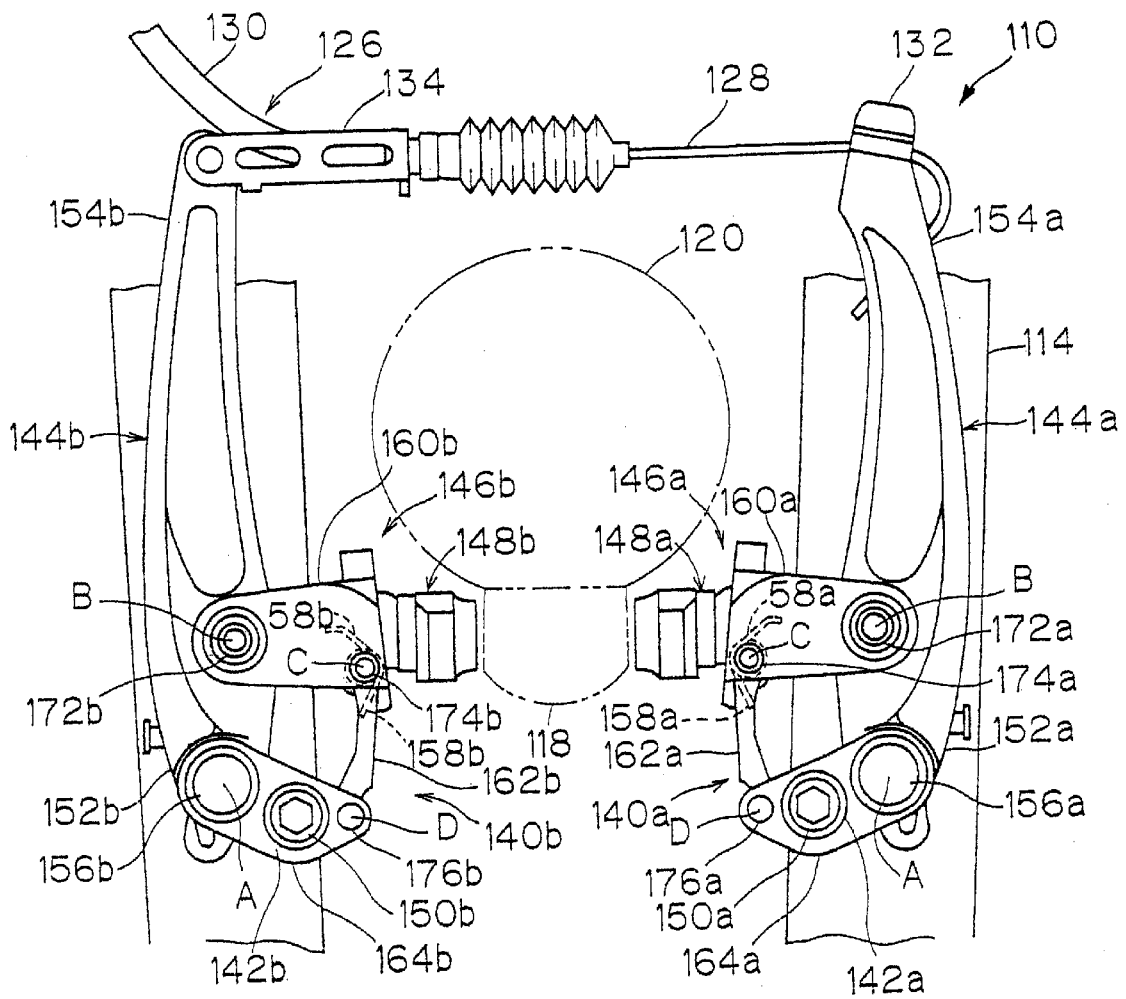
FIG. 7 is a front elevational view of the bicycle brake device in accordance with a second embodiment of the present invention with the brake device coupled to the front fork of the bicycle.
Figure 9:
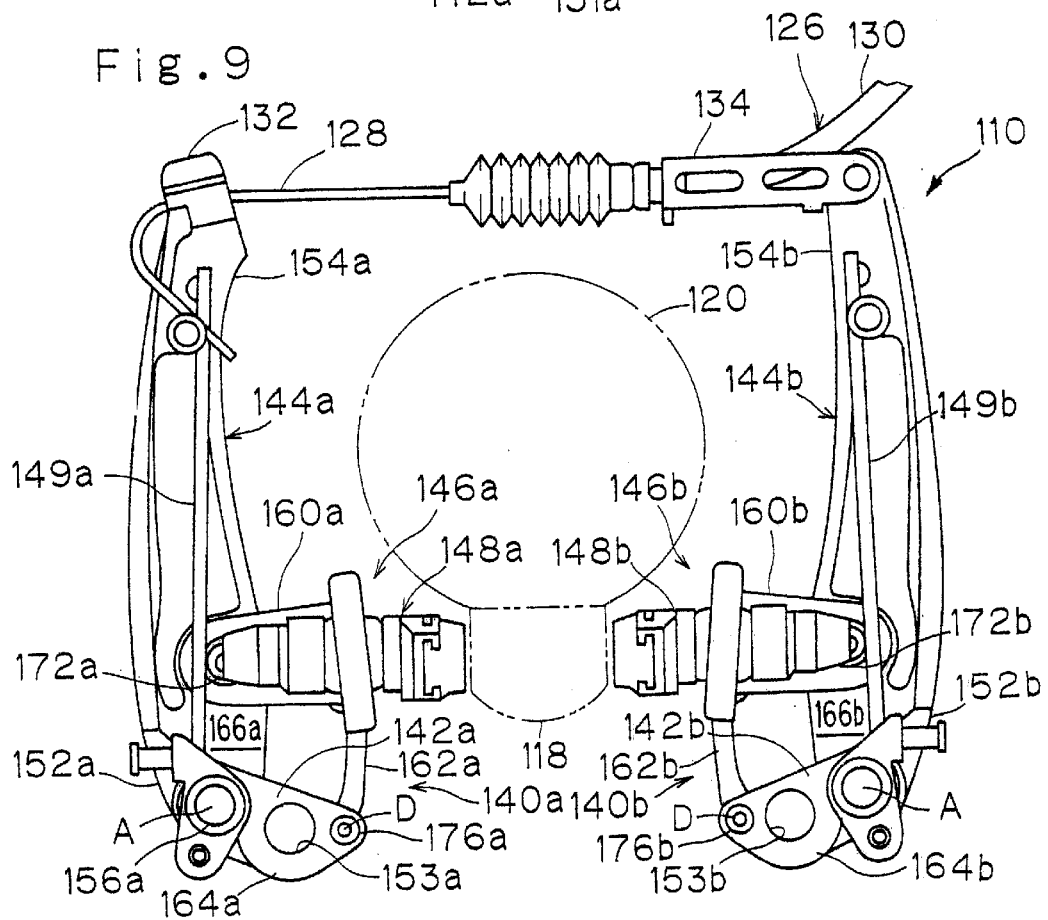
FIG. 9 is a rear elevational view of the bicycle brake device illustrated in FIGS. 7 and 8 in accordance with the second embodiment of the present invention.

As best seen in FIGS. 7 and 9, brake device 110 is operatively coupled to a brake operating device via a brake cable 126 having an inner brake wire 128 and an outer casing 130. Basically, the rider will operate the brake operating device which in turn will cause the brake device 110 to move inwardly to apply a braking force against rim 118 of the bicycle wheel 120. Upon releasing the brake operating device, the bicycle brake device 110 will release rim 118 to allow bicycle wheel 120 to rotate relative to the bicycle frame 114.

Brake device 110 basically includes a pair of brake mechanisms 140a and 140b which are substantially mirror images of each other, except for their connections to brake cable 126. Brake arm 144a is coupled to brake cable 126 via a lock bolt 132 which clamps brake wire 128 thereto. The outer casing 130 of brake cable 126 is coupled to brake arm 144b by a connecting arm 134 which is pivotally coupled at one end to brake arm 144b and has the outer casing of brake cable 126 coupled to it inner end.

Basically, right brake mechanism 140a includes a brake arm 144a, a linkage assembly 146a coupled to brake arm 144a for pivotally moving a brake shoe assembly 148a and a return spring 149a for moving brake arm 144a, linkage assembly 146a and brake shoe assembly 148a from a braking position to a release position. Right brake mechanism 140a pivots about pivot axis A. During pivotal movement of right braking mechanism 140a, brake shoe assembly 148a moves its brake pad against the rim 118 of the bicycle wheel 120 to prevent rotation of bicycle wheel 120 relative to bicycle frame 114. Movement of bicycle shoe assembly 148a is controlled by linkage assembly 146a to ensure a powerful braking force is obtained.

Likewise, left brake mechanism 140b basically includes a brake arm 144b, a linkage assembly 146b coupled to brake arm 144b for pivotally moving a brake shoe assembly 148b and a return spring 149b for moving brake arm 144b, linkage assembly 146b and brake shoe assembly 148b from a braking position to a release position. In view of the substantial similarities between right and left brake mechanisms 140a and 140b, only the right brake mechanism 140a will be described and illustrated in detail herein.

Linkage assemblies 146a and 146b fixedly couple right and left brake mechanisms 140a and 140b to frame 114 via mounting pins or screws 150a and 150b in a conventional manner. In particular, screws 150a and 150b extend through openings 153a and 153b (FIG. 9) in fixed links 264a and 264b and then are threaded into mounting posts 151a and 151b of frame 114, respectively. Mounting portions 142a and 142b are formed by lower links of linkage assemblies 146a and 146b.

Basically, linkage assemblies 146a and 146b are preferably designed in a manner similar to those disclosed in Ser. No. 08/895,560.

Figure 8:
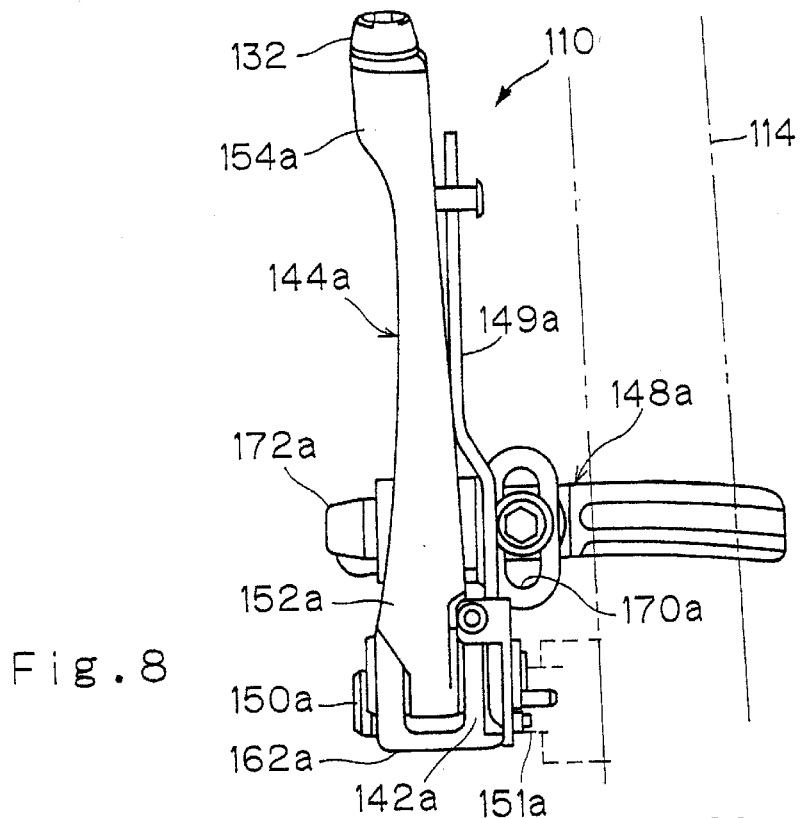
FIG. 8 is a right side elevational view of the bicycle brake device illustrated in FIG. 7 with the brake device coupled to the front fork of the bicycle.

Brake arms 144a and 144b are preferably constructed of a suitable rigid material. For example, brake arms 144a and 144b can be casted or machined from any suitable material such as aluminum, titanium, dense plastic, ceramic, acrylic, etc. Preferably, brake arms 144a and 144b are constructed of a lightweight material to minimize the weight of brake device 110. As best seen in FIGS. 7–9, brake arm 144a has a first or lower end 152a and an upper or second end 154a. Lower end 152a is pivotally coupled to mounting assembly 142a, while upper end 154a is coupled to wire 128 of brake cable 126. During braking, the upper or second end 154a of brake arm 144a is moved against the bias of return spring 149a by brake cable 126 to apply a braking force against rim 118 of the bicycle wheel 120. Accordingly, brake arm 144a rotates about a first pivot axis A which is formed by a pivot pin 156a.

Left brake arm 140b is similarly constructed, except for its upper end. Accordingly, the parts of brake arm 144b will be labeled with reference numerals similar to that of right brake arm 144a, except that the reference numerals will be designated with a letter "b" instead of letter "a".

Brake arms 144a and 144b have their upper ends 154a and 154b coupled to brake cable 126 in a conventional manner. Specifically, the upper end 154a of brake arm 144a is coupled to brake cable 126 via lock bolt 132 which is received in a threaded hole on the upper end 154a of the brake arm 144a. The lock bolt 132 clamps brake wire 128 against the upper end 154a of brake arm 144a. The outer casing 130 of brake cable 126 is coupled to the upper end 154b of brake arm 144b. In particular, as seen in FIGS. 7 and 9, connecting arm 134 is pivotally coupled to the upper end 154b of brake arm 144b at one end and has the outer casing 130 of brake cable 126 coupled to its inner end. Application of the brake operating device causes the upper ends 154a and 154b to move inwardly towards each other so that the brake pads of brake shoe assemblies 148a and 148b engages the side surfaces of rim 118.

Specifically, the upper ends 154a and 154b of brake arms 144a and 144b have brake shoe assemblies 148a and 148b coupled thereto via linkage assemblies 146a and 146b. Therefore, this pivotal movement of the brake arms 144a and 144b causes the brake pads of brake shoe assemblies 148a and 148b to engage the rim of the bicycle wheel. Of course, brake arms 144a and 144b are normally biased by return springs 149a and 149b from their braking positions to their release positions.

Linkage assemblies 146a and 146b are substantially identical and mirror images of each other and utilize biasing members 158a and 158b to provide a stabilizing force thereto for reducing vibrational movement or chatter. In view of the similarities between linkage assemblies 146a and 146b, they will be given identical reference numerals except for the right linkage assembly will be designated with a letter "a" and the left linkage assembly will be designated with a letter "b". Linkage assembly 146a forms a four-bar linkage assembly with brake arm 144a. In particular, linkage assembly 146a includes an upper or brake shoe attachment link 160a, an inner link 162a, a lower or fixed link 164a and a portion 166a of brake arm 144a forms a four-bar linkage. Portion 166a of brake arm 144a is the section of brake arm 144a that extends between the attachment points of upper and lower links 160a and 164a to form the fourth link of the four-bar linkage.

Linkage assembly 146a is designed to move brake shoe assembly 148a relatively uniformly each time in a generally horizontal direction. More specifically, brake shoe attachment link 160a has an outer end pivotally coupled to an intermediate portion of brake arm 144a and an inner end pivotally coupled to an upper end of inner link 162a. The lower end of inner link 162a is in turn pivotally connected to an inner end of the fixed or lower link 164a. The outer end of fixed or lower link 164a is pivotally coupled to brake arm 144a by the pivot pin 156a for pivoting about the pivot axis A.

Brake shoe assembly 148a is fixedly coupled to the inner end of brake shoe attachment link 160a. As brake arm 144a moves from a release position to a brake position, linkage position 146a controls the movement of brake shoe assembly 148a as it moves to engage the rim 118 of the bicycle wheel 120.

Brake shoe attachment link 160a and 160b are substantially identical, except that they are mirror images of each other. Each brake shoe attachment link 160a or 160b is basically a U-shaped member which straddles an intermediate portion of the brake arm 144a or 144b. The outer end of brake shoe attachment link 160a is pivotally coupled to brake arm 144a via a pivot pin 172a for pivotal movement about pivot axis B. The inner end of brake shoe attachment link 160a has an opening 170a therein for attaching brake shoe assembly 148a thereto in a conventional manner.

Inner link 162a is pivotally coupled to brake shoe attachment link 160a via pivot pin 174a and pivotally coupled to fixed lower link 164a at its lower end via a pivot pin 176a. In other words, brake shoe attachment link 160a and inner link 162a pivot relative to each other about pivot axis C formed by pivot pin 174a, while fixed lower link 164a and inner link 162a rotate relative to each other about pivot axis D formed by pivot pin 176a.

Fixed link 164a has mounting portion 142a located between pivot pins 156a and 176a such that during movement of brake arm 144a from a release position to a braking position or vice versa, fixed link 164a does not move. Fixed link 164a has its inner end coupled to the lower end of inner link 162a via pivot pin 176a. The outer end of fixed link 164a is coupled to pivot pin 156a such that brake arm 144a can rotate relative to fixed link 164a about pivot axis A.

In this embodiment, the biasing members 158a and 158b are positioned between brake shoe attachment links 160a, 160b and inner links 162a, 162b so as to apply a stabilizing force to linkage assemblies 146a and 146b. In particular, the biasing members 158a and 158b apply a force to linkage assemblies 146a and 146b to take up any play within the pivot points thereof. Accordingly, biasing members 158a and 158b reduce vibrational movement and chatter of linkage assemblies 146a and 146b. Biasing members 158a and 158b also bias linkage assemblies 146a and 146b from their braking positions to their release positions. In other words, biasing members 158a and 158b operate together to normally move brake shoe assemblies 148a and 148b away from rim 118 of bicycle wheel 120. It will be apparent to those skilled in the art that return springs 149a and 149b can be eliminated by installing biasing members 158a and 158b which have a sufficient return force to hold brake arms 144a and 144b in their release positions. Of course, the biasing members 158a and 158b illustrated in the drawings would have to be stronger and thicker than the springs to effectively work as return springs.

Figure 10:
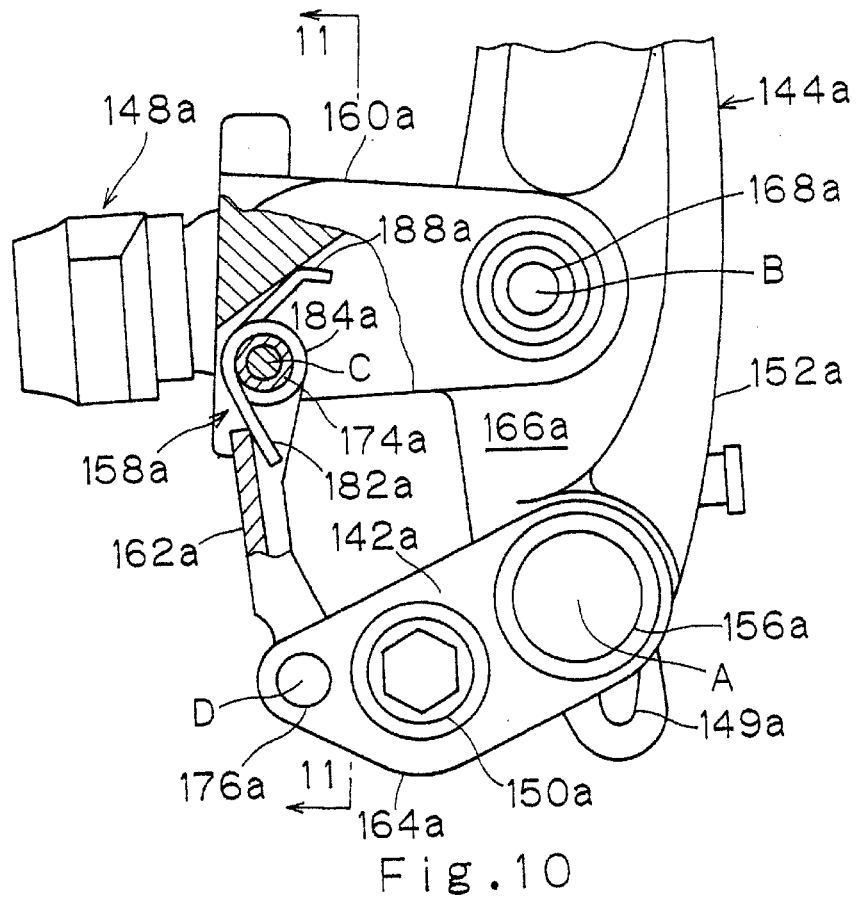
FIG. 10 is a partial, enlarged front elevational view of one of the brake mechanisms of the bicycle brake device illustrated in FIGS. 7–9 with portions broken away for purposes of illustrating selected parts.
Figure 11:
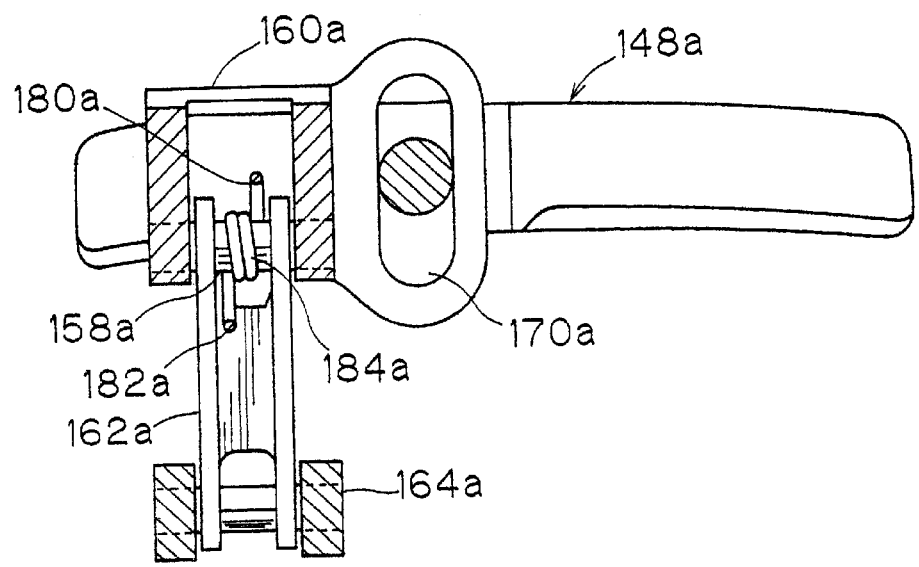
FIG. 11 is a cross-sectional view of one of the brake mechanisms illustrated in FIGS. 7–10 as viewed along section line 11—11 of FIG. 10.

As seen in FIGS. 10 and 11, biasing member 158a is preferably a torsion spring which is constructed of a suitable resilient material such as spring steel. Biasing member 158a has a first end 180a for engaging brake shoe attachment link 160a and a second end 182a for engaging inner link 162a.

Torsion spring or biasing member 158a also has a coiled portion 184a which is positioned about the pivot pin 174a which interconnects brake shoe attachment link 160a to second inner link 162a. Of course, biasing member 158b is similar in construction to biasing member 158a, and thus, biasing member 158b will not be discussed or illustrated herein.

Preferably, the distance between the axis of pin 156a and the axis of pin 172a is equal to the distance between the axis of pivot pin 174a and the axis of pivot pin 176a. In other words, the distance between axis A and B is substantially equal to the distance between axis C and D. Also, the distance between the axis of pivot pin 172a and the axis of pivot pin 174a is substantially equal to the distance between the axis of pivot pin 156a and the axis of pivot pin 176a. In other words, the distance between axis B and C is substantially equal to the distance between axis A and D. Specifically, the four pins 156a, 172a, 174a and 176a are arranged such that they form the apexes of a parallelogram with a four-bar linkage being formed therebetween.

Third Embodiment

Referring now to FIGS. 12–15, a brake device 210 is illustrated in accordance with a third embodiment of the present invention. This third embodiment differs from the first and second embodiments in that the return springs 249a and 249b are utilized to perform both the function of normally biasing the brake arms 244a and 244b from braking positions to release positions as well as applying a stabilizing force on each of the linkage assemblies 246a and 246b to reduce vibrational movement thereof. In view of the similarities between the third embodiment and the two prior embodiments, only the main differences between the third and the prior embodiments will be discussed and illustrated in detail herein.

Figure 12:
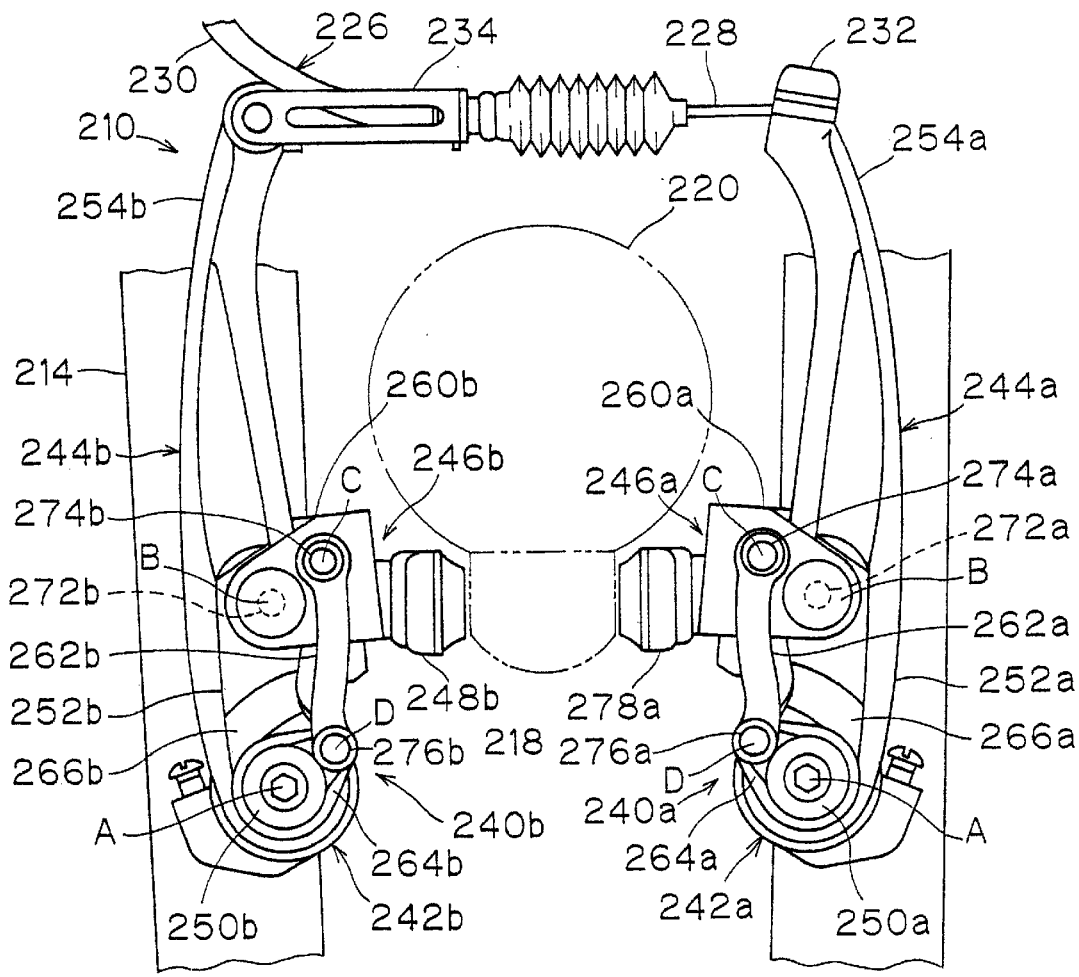
FIG. 12 is a front elevational view of the bicycle brake device in accordance with a third embodiment of the present invention with the brake device coupled to the front fork of the bicycle.
Figure 14:
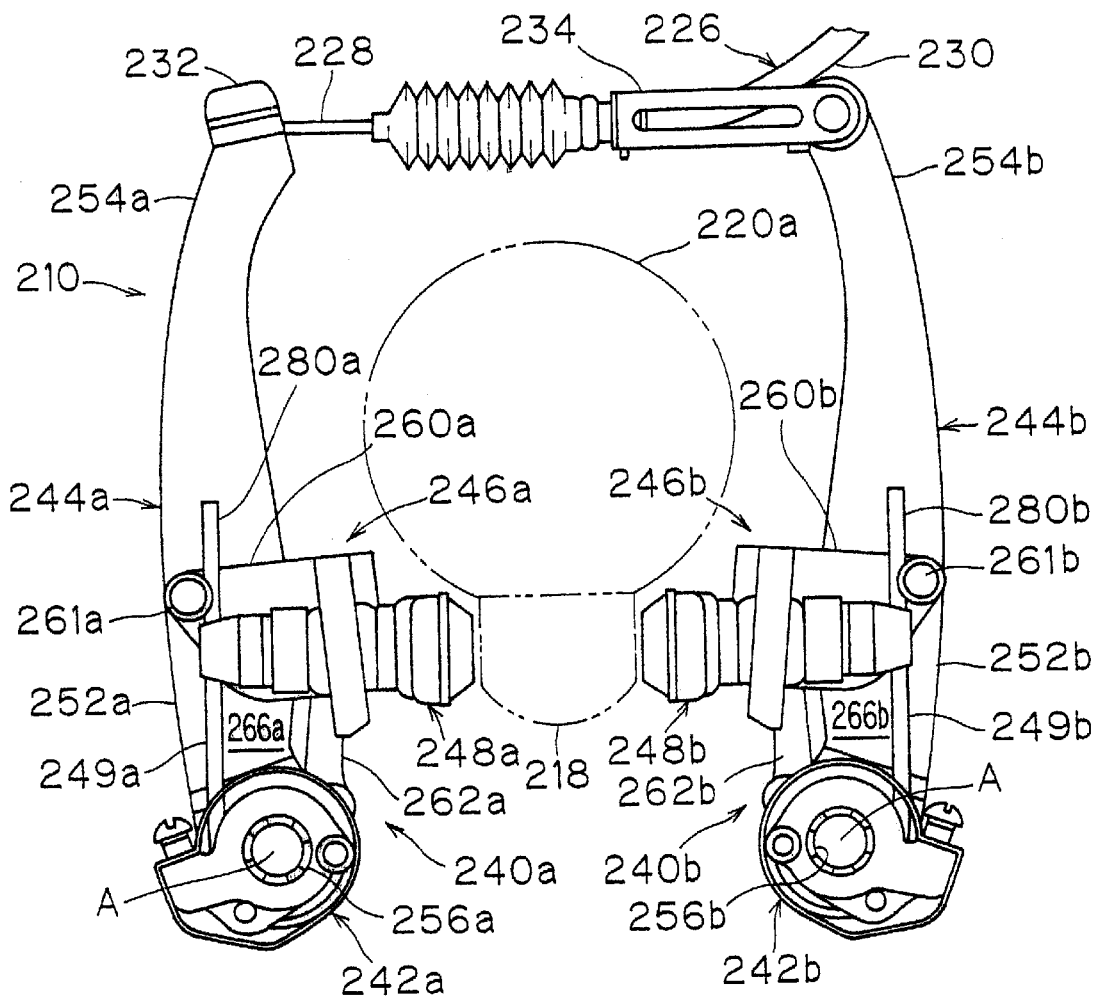
FIG. 14 is a rear elevational view of the bicycle brake device illustrated in FIGS. 12 and 13 in accordance with the third embodiment of the present invention.

As best seen in FIGS. 12 and 14, brake device 210 is operatively coupled to the brake operating device via a brake cable 226 having an inner brake wire 228 and an outer casing 230. Basically, the rider will operate the brake operating device which in turn will cause the brake device 210 to move inwardly to apply a braking force against rim 218 of the bicycle wheel 220. Upon releasing the brake operating device, the bicycle brake device 210 will release rim 218 to allow bicycle wheel 220 to rotate relative to the bicycle frame 214.

As best seen in FIGS. 12 and 14, brake device 210 basically includes a pair of brake mechanisms 240a and 240b which are substantially mirror images of each other, except for their connections to brake cable 226. Brake arm 244a is coupled to brake cable 226 via a lock bolt 232 which clamps brake wire 228 thereto. The outer casing 230 of brake cable 226 is coupled to brake arm 244b by a connecting arm 234 which is pivotally coupled at one end to brake arm 244b and has the outer casing of brake cable 226 coupled to its inner end.

Basically, right brake mechanism 240a includes a mounting assembly 242a for attachment to frame 214 of the bicycle, a brake arm 244a pivotally coupled to mounting assembly 242a, a linkage assembly 246a coupled to brake arm 244a, a brake shoe assembly 248a movably coupled to brake arm 244a via linkage assembly 246a and a return spring 249a for moving brake arm 244a, linkage assembly 246a and brake shoe assembly 248a from a braking position to a release position. Right brake mechanism 240a pivots about pivot axis A. In particular, mounting assembly 242a is supported on pivot pin of frame 214 of the bicycle for supporting right brake mechanism 240a between a release position and a braking position. During pivotal movement of right braking mechanism 240a, brake shoe assembly 248a moves its brake pad against the rim 218 of the bicycle wheel 220 to prevent rotation of bicycle wheel 220 relative to bicycle frame 214. Movement of bicycle shoe assembly 248a is controlled by linkage assembly 246a to ensure a powerful braking force is obtained.

Likewise, left brake mechanism 240b basically includes a mounting assembly 242b for attachment to frame 214 of the bicycle, a brake arm 244b pivotally coupled to mounting assembly 242b, a linkage assembly 246b coupled to brake arm 244b, a brake shoe assembly 248b movably coupled to brake arm 244b via linkage assembly 246b and a return spring 249b for moving brake arm 244b, linkage assembly 246b and brake shoe assembly 248b from a braking position to a release position. In view of the substantial similarities between right and left brake mechanisms 240a and 240b, only the right brake mechanism 240a will be described and illustrated in detail herein.

Figure 13:
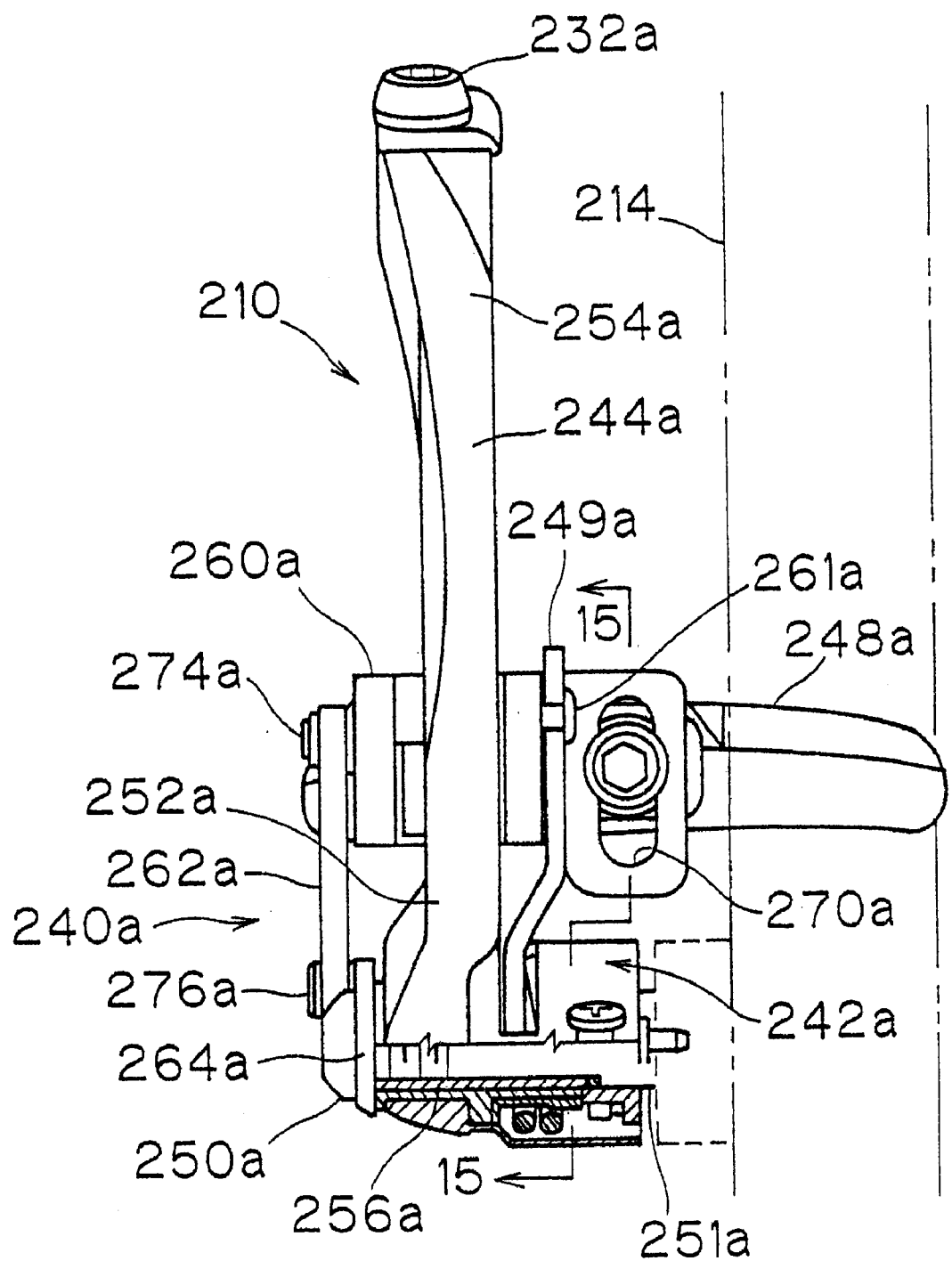
FIG. 13 is a right side elevational view of the bicycle brake device illustrated in FIG. 12 with the brake device coupled to the front fork of the bicycle.

Mounting assemblies 242a and 242b fixedly couple right and left brake mechanisms 240a and 240b to frame 214 via mounting screws 250a and 250b in a conventional manner. In particular, as seen in FIG. 12 and 13, mounting screws 250a and 250b pass through tubular pivot pins 256a and 256b, and are then threaded into mounting posts 251a and 251b, of frame 214, respectively. Mounting assemblies 242a and 242b are relatively conventional mounting assemblies. Therefore, mounting assemblies 242a and 242b will not be discussed or illustrated in detail herein.

Brake arms 244a and 244b are preferably constructed of a suitable rigid material. For example, brake arms 244a and 244b can be casted or machined from any suitable material such as aluminum, titanium, dense plastic, ceramic, acrylic, etc. Preferably, brake arms 244a and 244b are constructed of a lightweight material to minimize the weight of brake device 210. As best seen in FIGS. 12–14, brake arm 244a has a first or lower end 252a and an upper or second end 254a. Lower end 252a is pivotally coupled to mounting assembly 242a for movement between a release position and a braking position. In particular, the upper or second end 254a of brake arm 244a is moved against the bias of return spring 249a by brake cable 226 to apply a braking force against rim 218 of the bicycle wheel 220. Accordingly, brake arm 244a rotates about a first pivot axis A which is formed by a tubular pivot pin 256a which mounts brake arm 244a to the frame 214 of the bicycle as well as mounts a portion of linkage assembly 246a thereto, as discussed below. Left brake arm 240b is similarly constructed, except for its upper end. Accordingly, the parts of brake arm 244b will be labeled with reference numerals similar to that of right brake arm 244a, except that the reference numerals will be designated with a letter "b" instead of letter "a".

Brake arms 244a and 244b have their upper ends 254a and 254b coupled to brake cable 226 in a conventional manner. Specifically, the upper end 254a of brake arm 244a is coupled to brake cable 226 via lock bolt 232 which is received in a threaded hole on the upper end 254a of the brake arm 244a. The lock bolt 232 clamps brake wire 228 against the upper end 254a of brake arm 244a. The outer casing 230 of brake cable 226 is coupled to the upper end 254b of brake arm 244b. In particular, as seen in FIG. 12 and 14, connecting arm 234 is pivotally coupled to the upper end 254b of brake arm 244b at one end and has the outer casing 230 of brake cable 226 coupled to its inner end. Application of the brake operating device causes the upper ends 254a and 254b to move inwardly towards each other so that the brake pads of brake shoe assemblies 248a and 248b engages the side surfaces of rim 218.

Specifically, the upper ends 254a and 254b of brake arms 244a and 244b have brake shoe assemblies 248a and 248b coupled thereto via linkage assemblies 246a and 246b. Therefore, this pivotal movement of the brake arms 244a and 244b causes the brake pads of brake shoe assemblies 248a and 248b to engage the rim of the bicycle wheel.

Linkage assemblies 246a and 246b are substantially identical and mirror images of each other. Therefore, linkage assemblies 246a and 246b will be given identical reference numerals except for the right linkage assembly will be designated with a letter "a" and the left linkage assembly will be designated with a letter "b". Linkage assembly 246a forms a four-bar linkage assembly with brake arm 244a. In particular, linkage assembly 246a includes an upper or brake shoe attachment link 260a, an inner link 262a, a lower or fixed link 264a and a portion 266a of brake arm 244a forms a four-bar linkage. Portion 266a of brake arm 244a is the section of brake arm 244a that extends between the attachment points of upper and lower links 260a and 264a to form the fourth link of the four-bar linkage.

Linkage assembly 246a is designed to move brake shoe assembly 248a relatively uniformly each time in a generally horizontal direction. More specifically, brake shoe attachment link 260a has an outer end pivotally coupled to an intermediate portion of brake arm 244a and an inner end pivotally coupled to an upper end of inner link 262a. The lower end of inner link 262a is in turn pivotally connected to an inner end of the fixed link 264a. The outer end of fixed link 264a is pivotally coupled to brake arm 244a by the pivot pin 256a for pivoting about the pivot axis A.

Brake shoe assembly 248a is fixedly coupled to the inner end of brake shoe attachment link 260a. As brake arm 244a moves from a release position to a brake position, linkage position 246a controls the movement of brake shoe assembly 248a as it moves to engage the rim 218 of the bicycle wheel 220.

Brake shoe attachment link 260a and 260b are substantially identical, except that they are mirror images of each other. Each brake shoe attachment link 260a or 260b is basically a U-shaped member which straddles an intermediate portion of the brake arm 244a or 244b. The outer end of brake shoe attachment link 260a is pivotally coupled to brake arm 244a via a pivot pin 272a for pivotal movement about pivot axis B. The inner end of brake shoe attachment link 260a has an opening 270a therein for attaching brake shoe assembly 248a thereto in a conventional manner.

Inner link 262a is pivotally coupled to brake shoe attachment link 260a via pivot pin 274a and pivotally coupled to fixed lower link 264a at its lower end via a pivot pin 276a. In other words, brake shoe attachment link 260a and inner link 262a pivot relative to each other about pivot axis C formed by pivot pin 274a, while fixed lower link 264a and inner link 262a rotate relative to each other about pivot axis D formed by pivot pin 276a.

Fixed link 264a is fixedly coupled to mounting assembly 242a such that during movement of brake arm 244a from a release position to a braking position or vice versa, fixed link 264a does not move. Fixed link 264a has its inner end coupled to the lower end of inner link 262a via pivot pin 276a. The outer end of fixed link 264a is coupled to pivot pin 256a such that brake arm 244a can rotate relative to fixed link 264a about pivot axis A.

Figure 15:
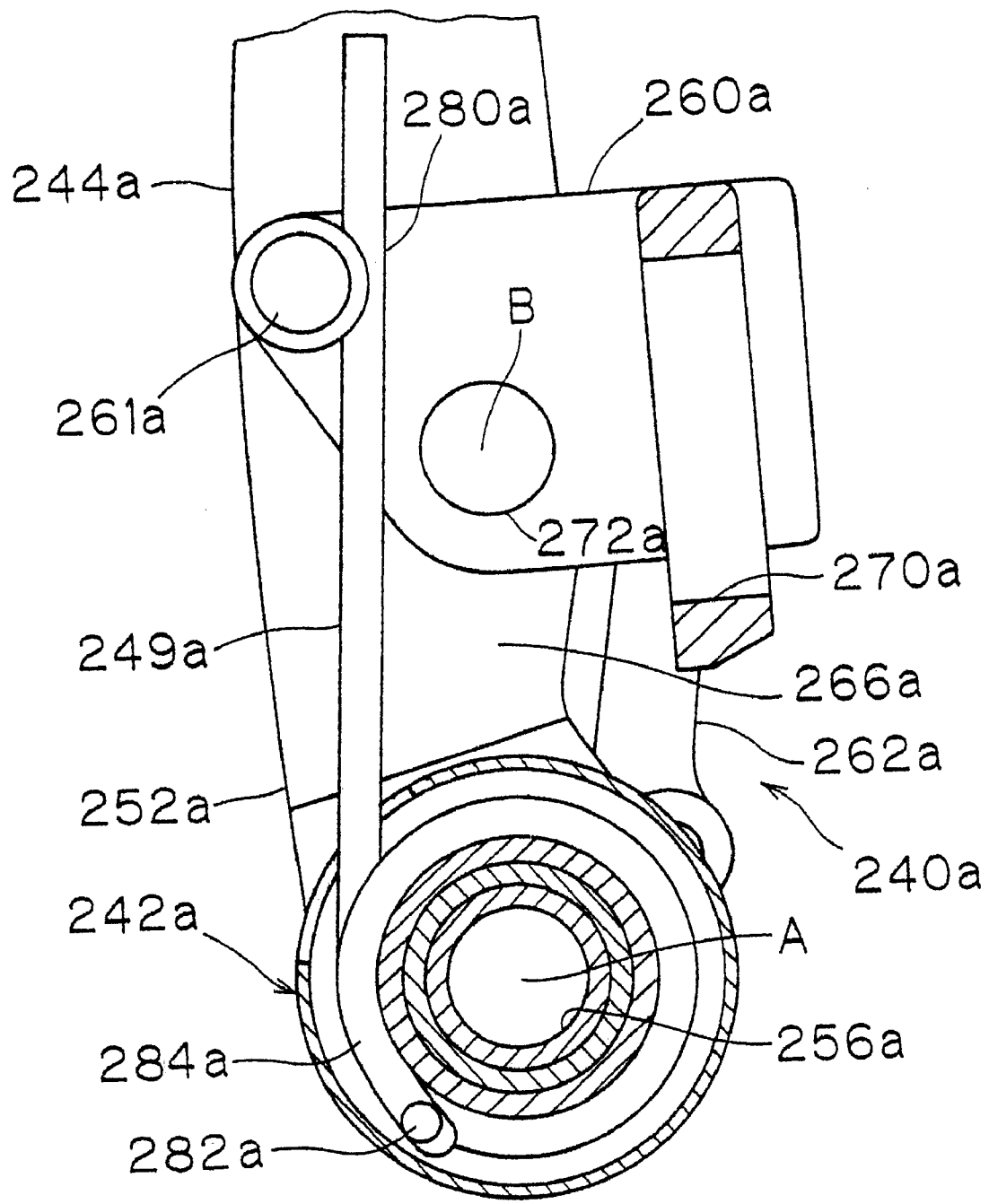
FIG. 15 is a partial, enlarged cross-sectional view of one of the brake mechanisms illustrated in FIGS. 12–14 as viewed along section line 15—15 of FIG. 13.

In this embodiment, the return spring 249a engages pin 261a of brake shoe attachment link 260a to apply a stabilizing force to linkage assembly 246a. In particular, return spring 249a applies a force to linkage assembly 246a to take up any play within the pivot points thereof. Accordingly, return spring 249a reduces vibrational movement of linkage assembly 246a, More specifically, as seen in FIGS. 13–15, return spring 249a is preferably a torsion spring which is constructed of a suitable resilient material such as spring steel. As seen in FIGS. 14 and 15 return spring 249a has a first end 280a for engaging pin 261a coupled to brake shoe attachment link 260a and a second end 282a for engaging mounting member 242a. Return spring 249a also has a coiled portion 284a which is positioned about the pivot pin 256a which pivotally couples brake arm 244a to frame 214.

Preferably, the distance between the axis of pin 256a and the axis of pin 272a is equal to the distance between the axis of pivot pin 274a and the axis of pivot pin 276a. In other words, the distance between axis A and B is substantially equal to the distance between axis C and D. Also, the distance between the axis of pivot pin 272a and the axis of pivot pin 274a is substantially equal to the distance between the axis of pivot pin 256a and the axis of pivot pin 276a. In other words, the distance between axis B and C is substantially equal to the distance between axis A and D. Specifically, the four pins 256a, 272a, 274a and 276a are arranged such that they form the apexes of a parallelogram with a four-bar linkage being formed therebetween.

While only three embodiments of the present invention has been described and illustrated herein, it will be apparent to those skilled in the art once given this disclosure that various modifications, changes, improvements and variations may be made without departing from the spirit or scope of this invention as defined in the following claims.

What is claimed is:

1. A bicycle brake device, comprising:
   a first brake mechanism adapted to be movably coupled to a bicycle frame and a second brake mechanism adapted to be movably coupled to the bicycle frame; each of said brake mechanisms, including
      a brake arm having a first end adapted to pivot about a first pivot axis and a second end adapted to be coupled to a brake cable,
      a first link member having an outer end pivotally coupled to said brake arm about a second pivot axis and an inner end with a brake shoe attachment portion fixedly coupled thereto,
      a second link member having an upper end pivotally coupled to said inner end of said first link member about a third pivot axis and a lower end spaced from said upper end,
      a third link member having an inner end pivotally coupled to said lower end of said second link about a fourth pivot axis and an outer end pivotally coupled to said first end of said brake arm about said first pivot axis to form a fourth link between said first and second pivot axes, and
      a biasing member being coupled between said first and second links to apply a stabilizing force therebetween.

2. A bicycle brake device according to claim 1, wherein said third link of each of said brake mechanisms has an attachment portion configured to be fixedly coupled to the bicycle frame.

3. A bicycle brake device according to claim 1, wherein each of said brake mechanisms has a first pivot pin coupling said outer end of said third link to said first end of said brake arm about said first pivot axis with said first pivot pin adapted to be fixedly coupled to the bicycle frame.

4. A bicycle brake device according to claim 1, wherein each of said brake mechanisms has a first end of said biasing member engaging said first link and a second end engaging said fourth link.

5. A bicycle brake device according to claim 4, wherein each of said brake mechanisms includes a return spring coupled to said brake arm.

6. A bicycle brake device according to claim 1, wherein said biasing member of each of said brake mechanisms is a return spring which is arranged for both normally biasing said brake arm from a braking position and a release position and applying said stabilizing force to reduce vibrational movement of said second link.

7. A bicycle brake device according to claim 6, wherein said return spring of each of said brake mechanisms has a coil portion positioned about said first pivot axis.

8. A bicycle brake device comprising:
   a first brake mechanism adapted to be movably coupled to a bicycle frame and a second brake mechanism adapted to be movably coupled to the bicycle frame; each of said brake mechanisms, including
      a brake arm having a first end adapted to pivot about a first pivot axis and a second end adapted to be coupled to a brake cable,
      a first link member having an outer end pivotally coupled to said brake arm about a second pivot axis and an inner end with a brake shoe attachment portion fixedly coupled thereto,
      a second link member having an upper end pivotally coupled to said inner end of said first link member about a third pivot axis and a lower end spaced from said upper end,
      a third link member having an inner end pivotally coupled to said lower end of said second link about a fourth pivot axis and an outer end pivotally coupled to said first end of said brake arm about said first pivot axis to form a fourth link between said first and second pivot axes, and
      a biasing member engaging two of said links to apply a stabilizing force therebetween,
   each of said brake mechanisms having a first end of said biasing member engaging said first link and a second end engaging said second link.

9. A bicycle brake device according to claim 8, wherein each of said brake mechanisms includes a return spring coupled to said brake arm.

10. A bicycle brake device according to claim 9, wherein said return spring of each of said brake mechanisms has a coil portion positioned about said first pivot axis.

* * * * *